United States Patent
Guo

(10) Patent No.: US 9,315,123 B2
(45) Date of Patent: Apr. 19, 2016

(54) CHILD SAFETY SEAT ASSEMBLIES HAVING ANCHOR SYSTEMS

(75) Inventor: Zheng-Wen Guo, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 265 days.

(21) Appl. No.: 13/559,961

(22) Filed: Jul. 27, 2012

(65) Prior Publication Data
US 2013/0026804 A1    Jan. 31, 2013

(30) Foreign Application Priority Data

Jul. 29, 2011 (CN) ............................ 2011 1 0215384
Sep. 9, 2011 (CN) ............................ 2011 1 0267291

(51) Int. Cl.
*B60N 2/28* (2006.01)

(52) U.S. Cl.
CPC .............. *B60N 2/2806* (2013.01); *B60N 2/286* (2013.01); *B60N 2/289* (2013.01); *B60N 2/2821* (2013.01); *B60N 2/2824* (2013.01); *B60N 2/2827* (2013.01); *B60N 2/2863* (2013.01); *B60N 2/2875* (2013.01); *B60N 2/2887* (2013.01); *B60N 2/2893* (2013.01)

(58) Field of Classification Search
CPC .... B60N 2/2887; B60N 2/289; B60N 2/2893; B60N 2/2806; B60N 2/2821; B60N 2/2824; B60N 2/2827; B60N 2/286; B60N 2/2863; B60N 2/2875

USPC ....................................... 297/253, 252, 463.1
See application file for complete search history.

(56) References Cited

U.S. PATENT DOCUMENTS 5,466,044 A * 11/1995 Barley et al. ................... 297/252
5,746,478 A *  5/1998 Lumley et al. ............ 297/256.13
(Continued)

FOREIGN PATENT DOCUMENTS

CN    201077390 Y    6/2008
CN    201566524 U    12/2009
(Continued)

*Primary Examiner* — David R Dunn
*Assistant Examiner* — Tania Abraham
(74) *Attorney, Agent, or Firm* — David I. Roche; Baker & McKenzie LLP

(57) ABSTRACT

A child safety seat assembly comprises a base, two connector arms assembled with the base, at least one latch assembled with the base and operable to lock the connector arms in position with the base, and at least a release actuator disposed between the connector arms and operatively connected with the latch. The connector arms are provided with locking fasteners operable to engage with an anchorage bracket in a vehicle to lock the base in place, the connector arms being movable relative to the base to adjust a length of extension of the connector arms outside the base. The release actuator is operable to drive an unlocking displacement of the latch to allow adjustment of the connector arms relative to the base.

16 Claims, 19 Drawing Sheets

(56) References Cited

U.S. PATENT DOCUMENTS

| | | | |
|---|---|---|---|
| 5,890,762 A * | 4/1999 | Yoshida | 297/256.13 |
| 6,082,819 A * | 7/2000 | Jackson | 297/253 |
| 6,375,260 B1 * | 4/2002 | Hiramatsu et al. | 297/256.16 |
| 6,962,394 B2 * | 11/2005 | Anthony et al. | 297/253 |
| 7,328,946 B2 * | 2/2008 | Hendrikus Van Montfort et al. | 297/253 |
| 7,384,099 B2 * | 6/2008 | Schleif et al. | 297/253 |
| 7,467,825 B2 * | 12/2008 | Jane Santamaria | 297/253 |
| 7,726,737 B2 * | 6/2010 | Jane Santamaria | 297/253 |
| 8,226,162 B2 * | 7/2012 | Campbell et al. | 297/216.11 |
| 8,366,192 B2 * | 2/2013 | Clement et al. | 297/253 |
| 8,585,143 B2 * | 11/2013 | Xiao | 297/256.16 |
| 8,632,124 B2 * | 1/2014 | Clement et al. | 297/216.11 |
| 2007/0284924 A1 * | 12/2007 | Gold et al. | 297/253 |
| 2009/0261640 A1 * | 10/2009 | Christ et al. | 297/253 |
| 2009/0273215 A1 * | 11/2009 | Barker et al. | 297/253 |

FOREIGN PATENT DOCUMENTS

| | | | | |
|---|---|---|---|---|
| CN | 201677768 U | | 12/2010 | |
| EP | 1151893 A2 * | | 11/2001 | B60N 2/28 |
| EP | 1344679 A2 * | | 9/2003 | B60N 2/28 |
| EP | 1369293 A1 * | | 12/2003 | B60N 2/28 |
| EP | 1600325 A2 | | 11/2005 | |
| EP | 1997673 A2 * | | 12/2008 | B60N 2/28 |
| EP | 2210769 A2 * | | 7/2010 | B60N 2/28 |
| WO | 2008059036 A1 | | 5/2008 | |

* cited by examiner

CHILD SAFETY SEAT ASSEMBLIES HAVING ANCHOR SYSTEMS

CROSS-REFERENCE TO RELATED APPLICATIONS

This patent application claims priority to Chinese Patent Application No. 201110215384.5 filed on Jul. 29, 2011; and to Chinese Patent Application No. 201110267291.7 filed on Sep. 9, 2011.

BACKGROUND

1. Field of the Invention

The present inventions relate to child safety seat assemblies having anchor systems.

2. Description of the Related Art

Current safety legislation requires the use of a child safety seat for seating a young child in a vehicle. For installing the child safety seat in the vehicle, several approaches are currently proposed. One approach consists in using the seatbelt of the vehicle to secure the child safety seat. Another approach prescribed in the ISOFIX ("International Standard Organization Fix") standard proposes to integrate an anchor system in the child safety seat assembly that can attach with an anchorage bracket provided in the vehicle. The attachment between the anchor system of the child safety seat and the anchorage bracket of the vehicle can be defined by the ISOFIX standard so as to simplify installation of the child safety seat.

However, the construction of the anchor systems usually adds structural features to the child safety seat, and increases its volume. As a result, the child safety seat may not be conveniently stored or packaged for shipment. Moreover, the protruding structures of the anchor system may cause accidental injury during manipulation, and may also be subject to abrasive wear.

Therefore, there is a need for a child safety seat assembly that has an adjustable anchor system, which can address at least the foregoing issues.

SUMMARY

The present application describes child safety seat assemblies having adjustable anchor systems used for installation in a vehicle. In one embodiment, the child safety seat assembly comprises a base, two connector arms assembled with the base, at least one latch assembled with the base and operable to lock the connector arms in position with the base, and at least a release actuator disposed between the connector arms and operatively connected with the latch. The connector arms are provided with locking fasteners operable to engage with an anchorage bracket in a vehicle to lock the base in place, the connector arms being movable relative to the base to adjust a length of extension of the connector arms outside the base. The release actuator is operable to drive an unlocking displacement of the latch to allow adjustment of the connector arms relative to the base.

DETAILED DESCRIPTION OF THE EMBODIMENTS

Figure 1:
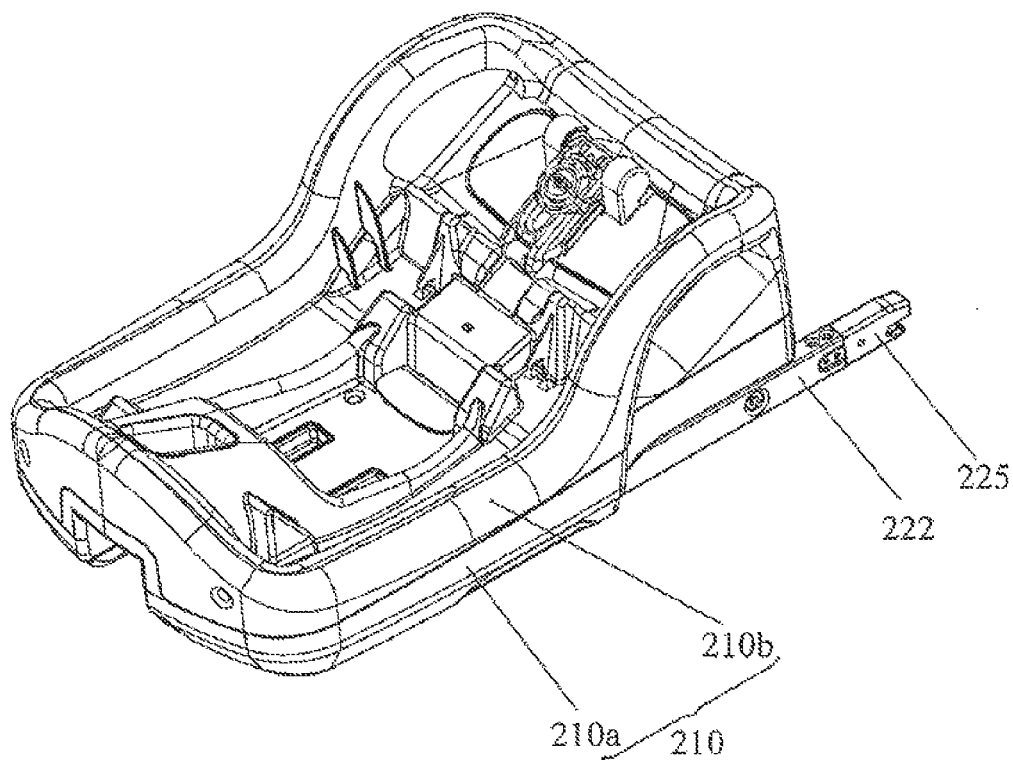
FIG. 1 is a schematic view illustrating an embodiment of a child safety seat assembly having an anchor system.
Figure 2:
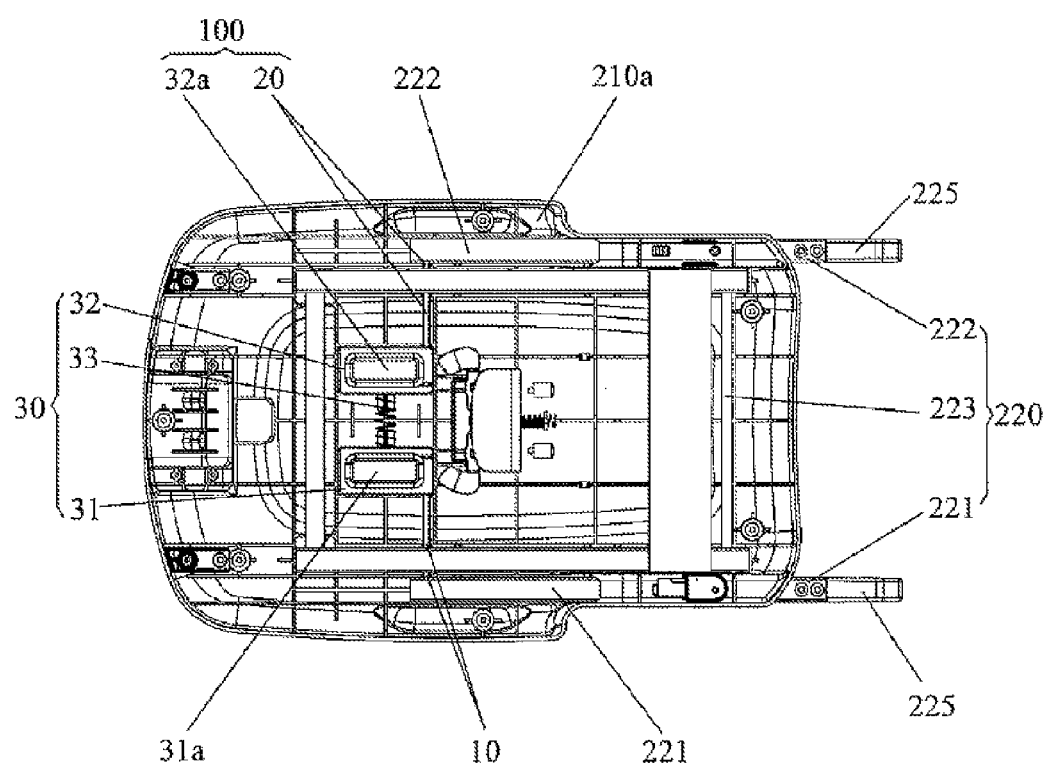
FIG. 2 is a schematic view illustrating a base of the child safety seat assembly shown in FIG. 1 provided with connector arms extending outward.

Referring to FIGS. 1 and 2, a child safety seat assembly can include a base 210 provided with an anchor structure 220 and an adjustment mechanism 100. The base 210 can be adapted to removably attach with a child seat. The anchor structure 220 can include two elongated connector arms 221 and 222 that are assembled at left and right sides of the base 210. For adjusting a length of extension of the connector arms 221 and 222 outside the base 210, the connector arms 221 and 222 can be movable back and forth to extend from and retract into the base 210.

The adjustment mechanism 100 can include a release actuating assembly 30, and latches 10 and 20. The latches 10 and 20 can be assembled with the base 210, and are operable to lock the connector arms 221 and 222 with the base 210. The release actuating assembly 30 can be disposed between the two connector arms 221 and 222, and include two release actuators 31 and 32 respectively connected with the latches 10 and 20. The release actuator 31 can be connected with an end of the latch 10, which can extend along a transversal direction and have another opposite end capable of engaging with the connector arm 221. Likewise, the release actuator 32 can be connected with an end of the latch 20, which can also extend along the transversal direction and have an opposite end capable of engaging with the connector arm 222. The release actuators 31 and 32 can be operable to drive the latches 10 and 20 to move in opposite directions transversally relative to the base 210 and the connector arms 221 and 222. The latches 10 and 20 can be operable to engage and lock the connector arms 221 and 222 in place, and disengage and unlock from the connector arms 221 and 222 to allow adjustment of the connector arms 221 and 222 relative to the base 210.

The base 210 can include a lower shell body 210a and an upper shell body 210b. The lower shell body 210a and the upper shell body 210b can be fixedly assembled together via fastener screws to define a housing shell through which the connector arms 221 and 222 and the adjustment mechanism 100 can be movably assembled. In accordance with the ISO-FIX standard, the connector arms 221 and 222 can have end portions provided with locking fasteners 225 operable to attach with an anchorage bracket provided in a vehicle to lock the base 210 in place.

Referring to FIGS. 2, 4-6, 8 and 9, the latch 10 can have an elongated shape extending transversally relative to the base 210, and with an end affixed with the release actuator 31. As better shown in FIGS. 6 and 8, the release actuator 31 can be formed as an integral handle, and the latch 10 can be affixed with the release actuator 31 via a pin 34. This assembly is simple to realize and reliable in construction. For assembling the release actuator 31 with the latch 10, the release actuator 31 can include a slot 31b that extends parallel to an axis of displacement of the release actuator 31, and a cavity 31c that extends parallel to an axis of displacement of the connector arm 221 and communicates with the slot 31b. The cavity 31c can have two opposite inner sidewalls from which claws 31d protrude toward the slot 31b. The latch 10 can be inserted through the slot 31b, and the pin 34 can be disposed in the cavity 31c and insert through the latch 10. The claw 31d can be disposed so as to abut against the pin 34, whereby movement of the pin 34 along the cavity 31c can be blocked to prevent detachment of the pin 34 from the latch 10 during operation. The pin 34 can be thereby securely held with the latch 10. Moreover, the latch 10 can have another end portion that can move parallel to the axis of displacement of the release actuator 31 to operatively engage and disengage the connector arm 221.

Figure 6:
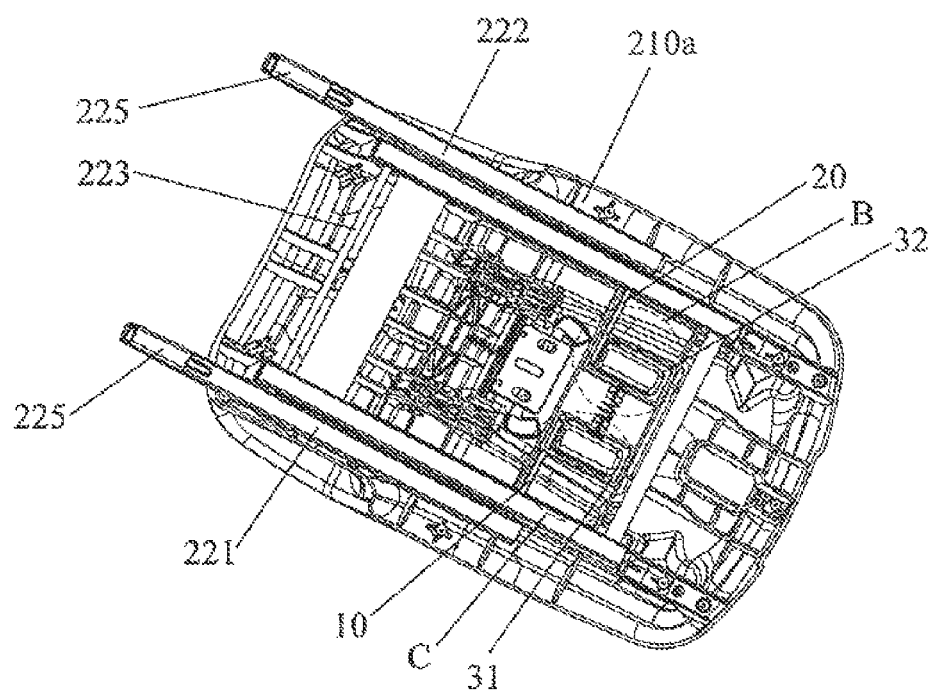
FIG. 6 is a schematic view illustrating the construction of the anchor system from a perspective opposite to that of FIG. 4.
Figure 7:
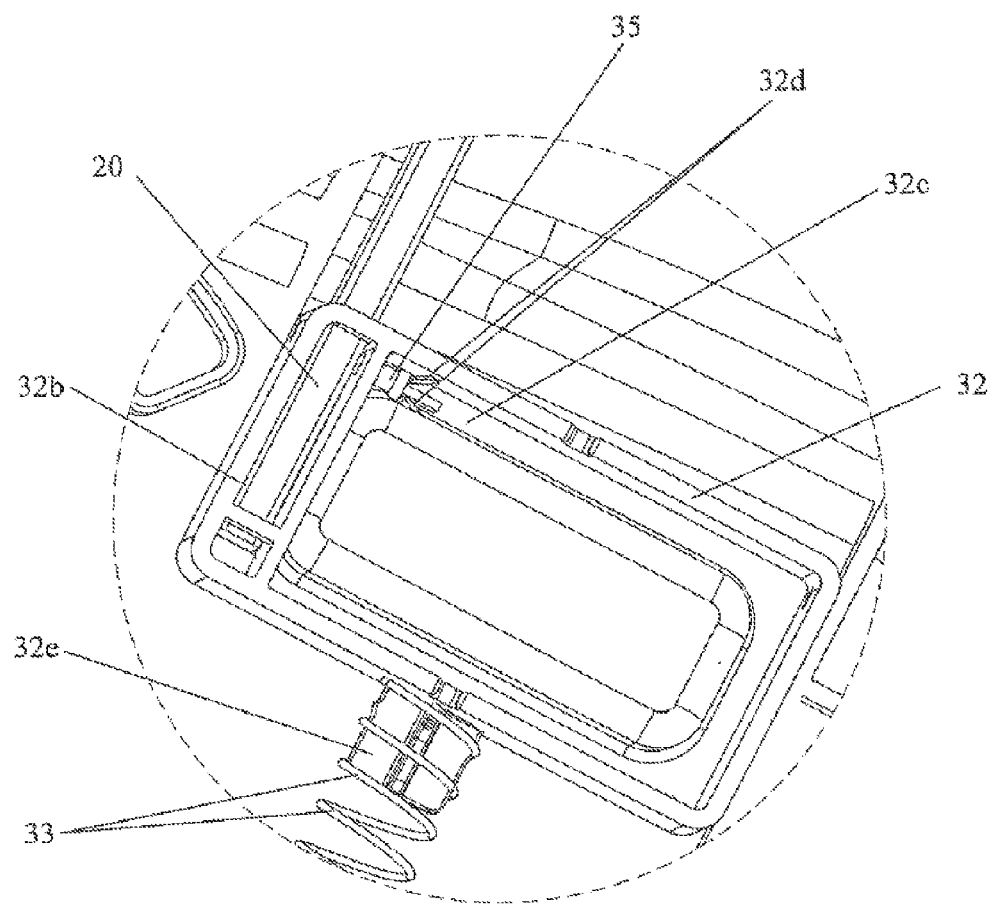
FIG. 7 is an enlarged view of portion B shown in FIG. 6.
Figure 8:
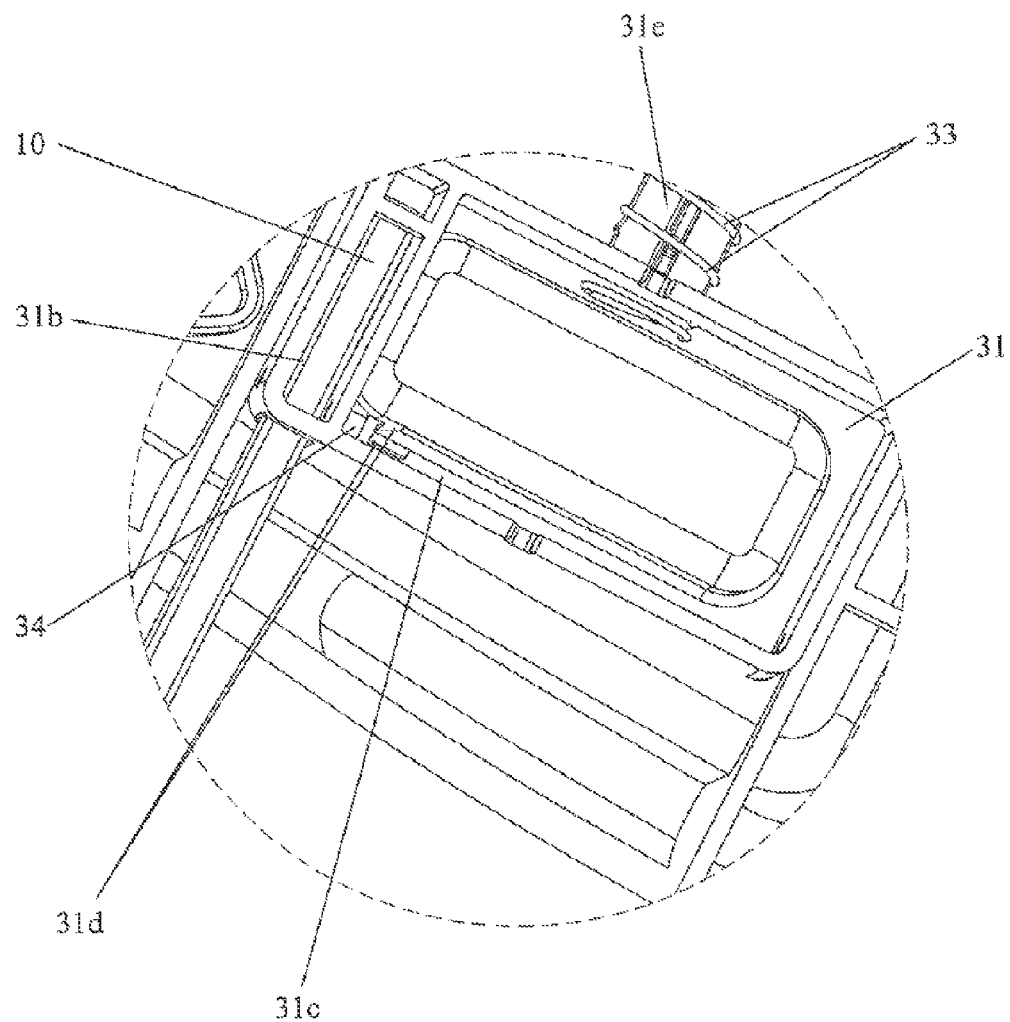
FIG. 8 is an enlarged view of portion C shown in FIG. 6.

Referring to FIGS. 6 and 7, the latch 20 can be assembled in a similar manner. More specifically, the latch 20 can have an elongated shape extending transversally relative to the base 210, and with an end affixed with the release actuator 32 via a pin 35. The release actuator 32 can include a slot 32b that extends parallel to an axis of displacement of the release actuator 32, and a cavity 32c that extends parallel to an axis of displacement of the connector arm 222 and communicates with the slot 32b. The cavity 32c can have two opposite inner sidewalls from which claws 32d protrude toward the slot 32b. The latch 20 can be inserted through the slot 32b, and the pin 35 can be disposed in the cavity 32c and insert through the latch 20. The claw 32d can be disposed so as to abut against the pin 35, whereby movement of the pin 35 along the cavity 32c can be blocked to prevent detachment of the pin 35 from the latch 20 during operation. The pin 35 can be thereby securely held with the latch 20. Moreover, the latch 20 can have another end portion that can move parallel to the axis of displacement of the release actuator 32 to operatively engage and disengage the connector arm 222.

When the release actuators 31 and 32 are moving transversally toward each other, the latches 10 and 20 can be concurrently driven in movement to unlock from the connector arms 221 and 22, respectively.

For facilitating the unlocking operation, the release actuators 31 and 32 can be disposed in alignment with a common transversal axis of the base 210. Moreover, middle areas of the release actuators 31 and 32 can be respectively provided with recessed cavities 31a and 32a to facilitate placement of the caregiver's fingers for operating the release actuators 31 and 32.

The release actuators 31 and 32 can recover initial positions corresponding to the locking state of the latches 10 and 20 by a spring force. In one embodiment, the release actuating assembly 30 can also include a spring 33 disposed between the release actuators 31 and 32. The spring 33 can have two opposite ends respectively mounted around studs 31e and 32e protruding toward each other from two mutually facing sidewalls of the release actuators 31 and 32. The spring 33 is operable to bias the release actuators 31 and 32 and the latches 10 and 20 toward a locking state.

Figure 9:
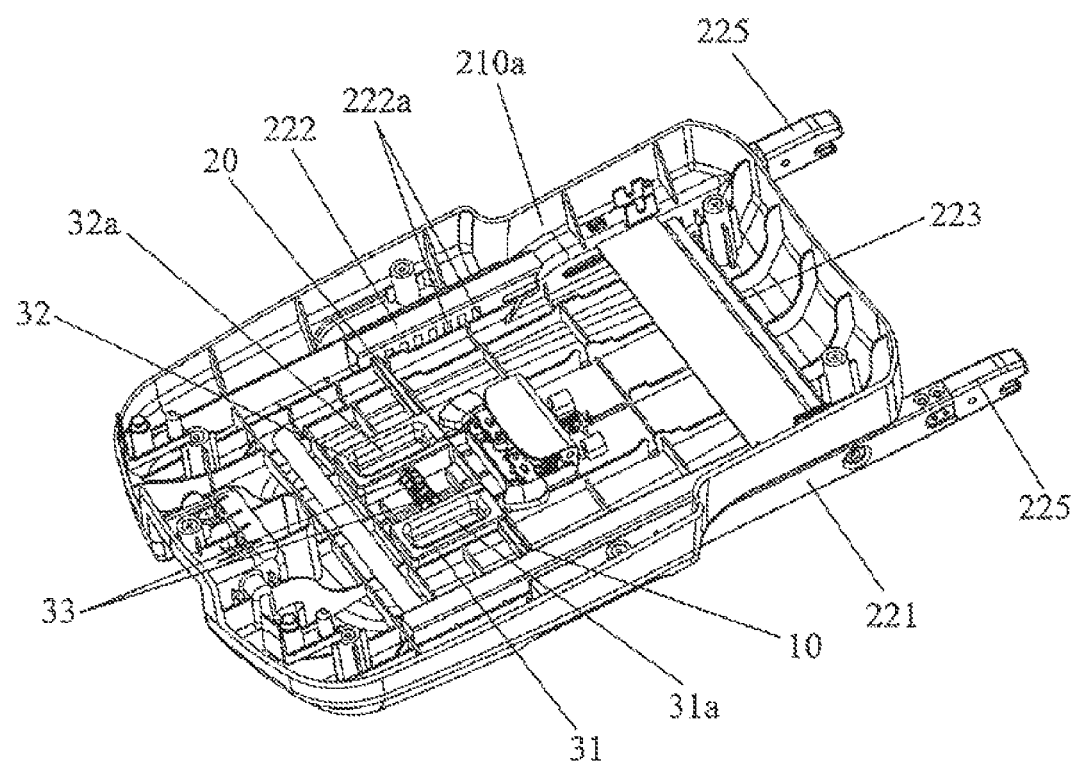
FIG. 9 is a schematic view illustrating the child safety seat assembly of FIG. 1 under another perspective.
Figure 10:
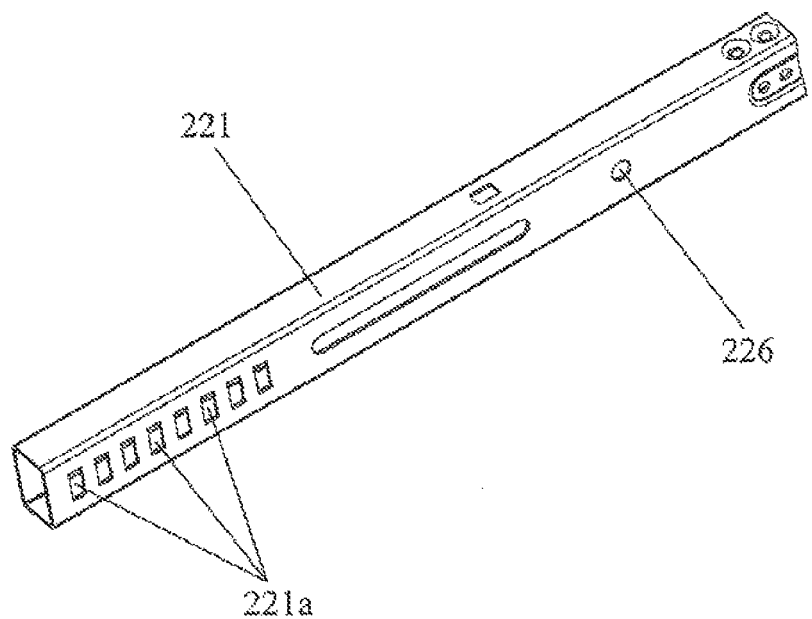
FIG. 10 is a schematic view illustrating a left connector arm of the anchor system.
Figure 11:
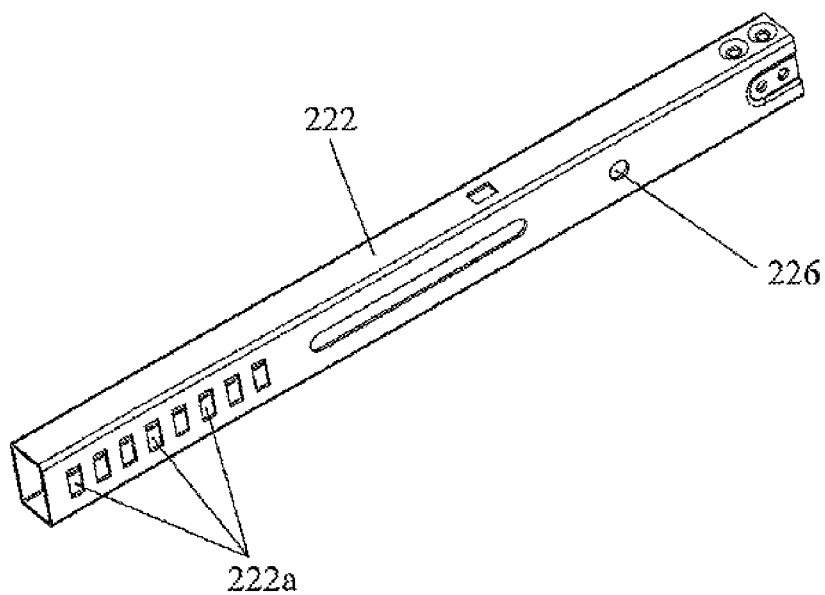
FIG. 11 is a schematic view illustrating a right connector arm of the anchor system.
Figure 12:
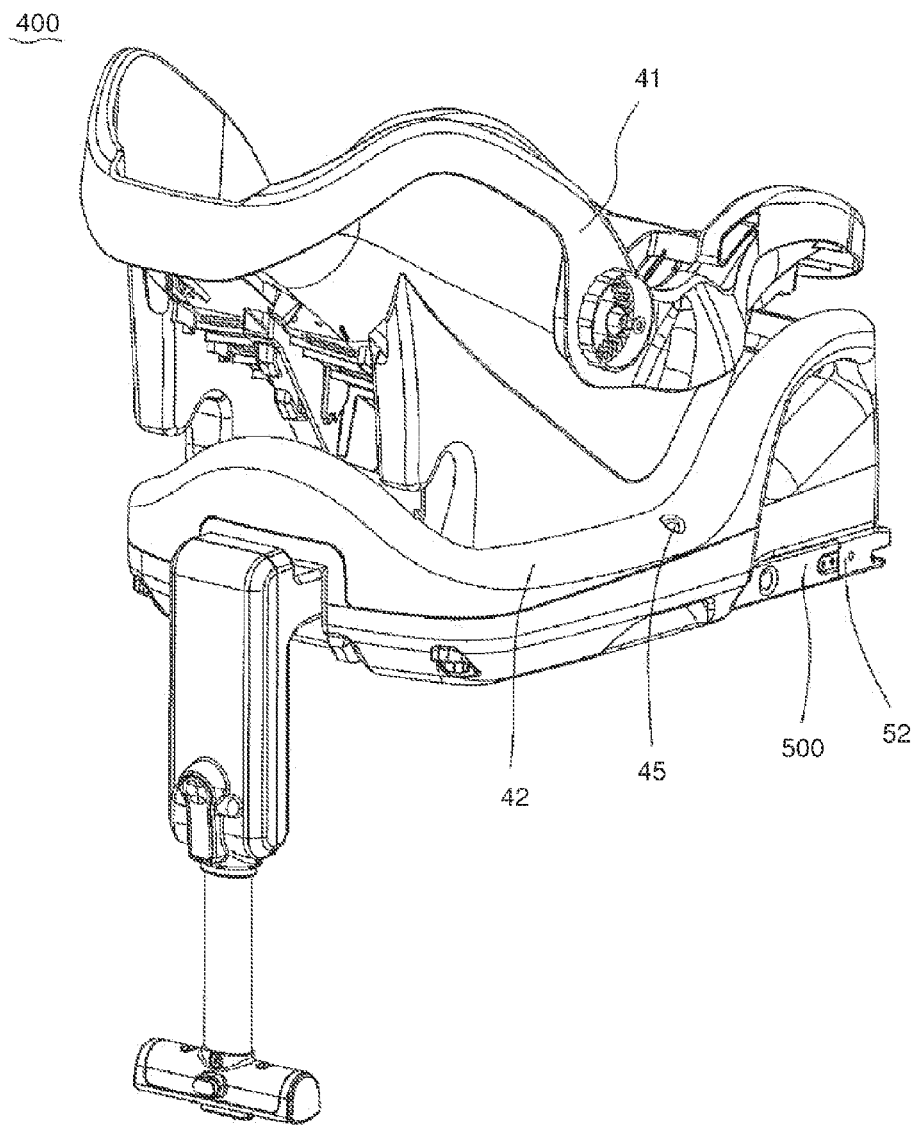
FIG. 12 is a perspective view illustrating another embodiment of a child safety seat assembly having an anchor system.

Referring to FIGS. 9-11, the connector arm 221 can include a row of locking openings 221a through any of which the latch 10 can engage to lock the connector arms 221 and 222 in position. Likewise, the connector arm 222 can include a row of locking openings 222a through any of which the latch 20 can engage to lock the connector arms 221 and 222 in position. Adjacent locking openings 221a on the connector arm 221 (and locking openings 222a on the connector arm 222) can be spaced apart from each other by a same or varying interval.

Referring to FIGS. 2-4, 6 and 9-11, the anchor structure 220 can include a transversal bar linkage 223 having two opposite ends respectively affixed with the connector arms 221 and 222. In one embodiment, the bar linkage 223 can fixedly engage through mount holes 226 provided in the connector arms 221 and 222. The arrangement of the bar linkage 223 can allow to concurrently drive the connector arms 221 and 222 during rearward and forward adjustment. The bar linkage 223 can also form an abuttal structure capable of preventing excessive displacements of the connector arms 221 and 222 that may result in their disassembling from the base 210.

Figure 3:
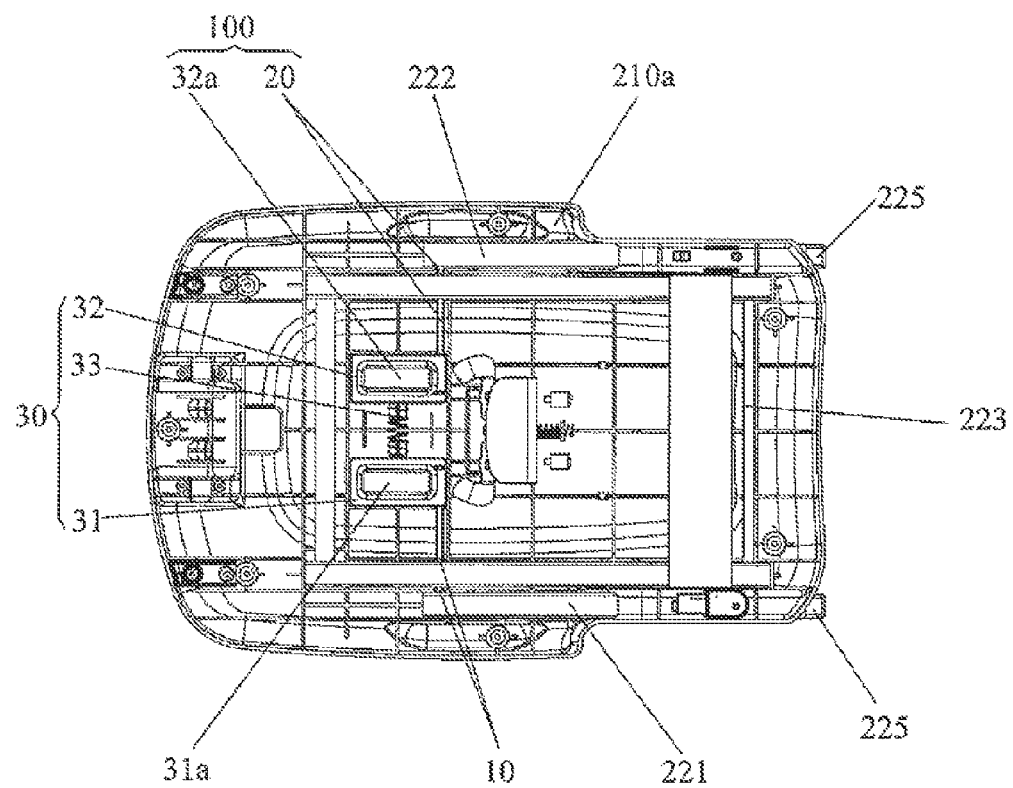
FIG. 3 is a schematic view illustrating the base with the connector arms retracted inward.
Figure 4:
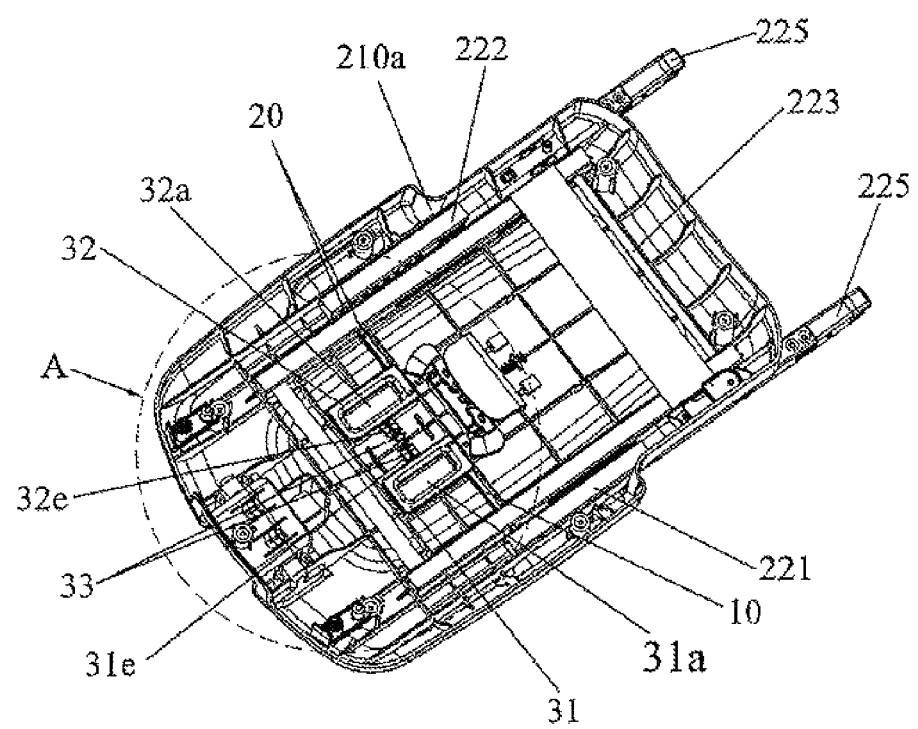
FIG. 4 is a schematic view illustrating the construction of the anchor system provided in the base.
Figure 5:
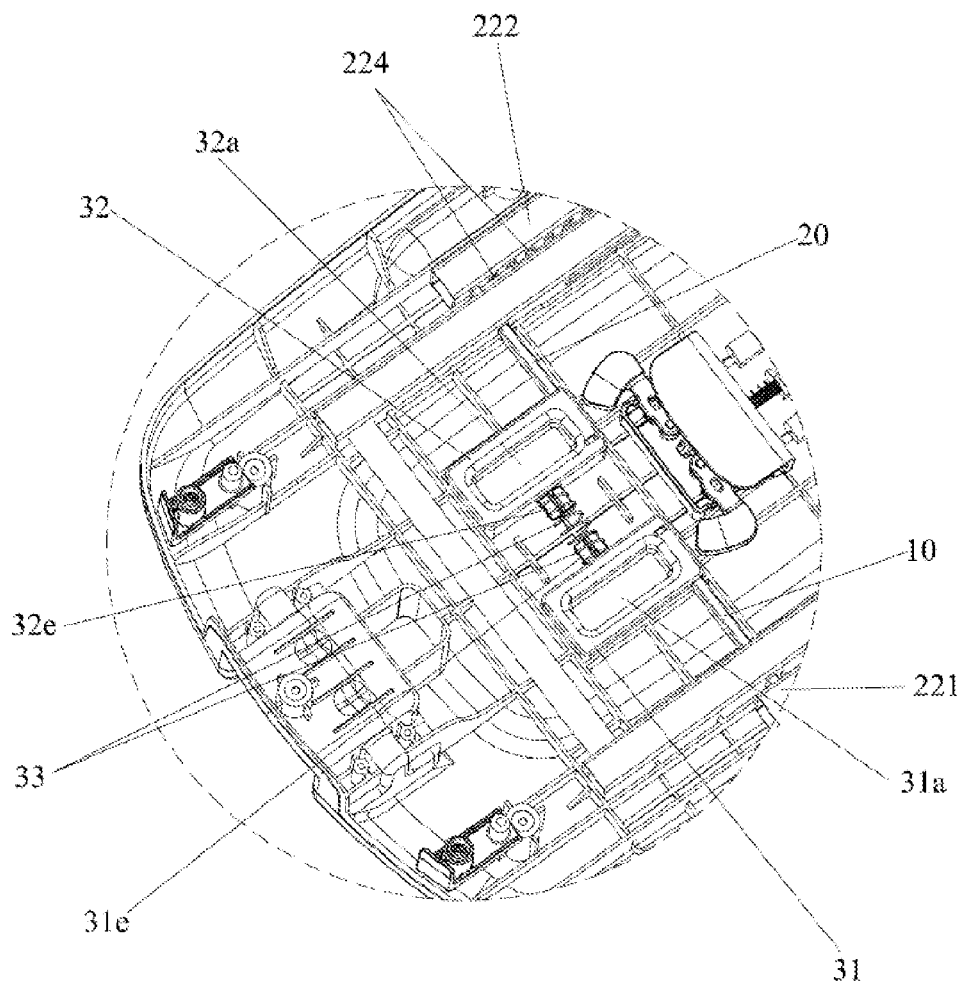
FIG. 5 is an enlarged view of portion A shown in FIG. 4.

Reference is made to FIGS. 1-11 to describe exemplary operation of the anchor structure 220. When the connector arms 221 and 222 are to be retracted into the base 210, the release actuators 31 and 32 can be manually operated to move transversally toward each other. Driven by the release actuators 31 and 32, the latches 10 and 20 can move toward each other to compress the spring 33 and disengage and unlock from the connector arms 221 and 222. Being unlocked, the connector arms 221 and 222 can be displaced forward relative to the base 210, the latches 10 and 20 and the release actuators 31 and 32 to retract toward the interior of the base 210. Once the connector arms 221 and 222 reach the retracted state as shown in FIG. 3, the release actuators 31 and 32 can be released. As a result, the spring 33 can drive the release actuators 31 and 32 and the associated latches 10 and 20 to move transversally away from each other until the latches 10 and 20 respectively engage and lock with the connector arms 221 and 222. The connector arms 221 and 222 can be thereby held in the retracted state.

When the connector arms 221 and 222 are to be adjusted to increase the length of the connector arms 221 and 222 outside the base 210, the latches 10 and 20 can be switched to the unlocked state like described previously. The connector arms 221 and 222 then can be moved rearward relative to the base 210, the latches 10 and 20 and the release actuators 31 and 32 to extend outward.

It is worth noting that alternate embodiments of the release actuating assembly 30 may also include two spring members respectively connected with the latches 10 and 20. In a locked state, the two spring members can bias the latches 10 and 20 to engage and lock with the connector arms 221 and 222 in place. When the connector arms 221 and 222 need to be adjusted, the two spring members can be displaced transversally toward each other so that the latches 10 and 20 can concurrently move toward each other to disengage and unlock from the connector arms 221 and 222. Once the unlocked connector arms 221 and 222 are adjusted to the desired positions, the spring members can urge the latches 10 and 20 to engage and lock with the connector arms 221 and 222, which can be thereby held in position.

With the anchor structure 220 described previously, the connector arms 221 and 222 can be desirably adjusted to extend outside the base 210 for attachment with a vehicle anchorage, or retracted to be substantially concealed in the base 210. Concealment of the connector arms 221 and 222 in the base 210 can facilitate storage and shipment of the base 210, and prevent inadvertent injuries caused by the exposure of sharp edges of the connector arms 221 and 222.

It is worth noting that while the association of two latches and release actuators have been described, alternate embodiments may also implement a simplified construction using one latch 10 or 20 associated with one release actuator 31 or 32. Since the two connector arms 221 and 222 are connected via the transversal bar linkage 223, this simplified construction may also work to lock the connector arms 221 and 222 in place.

FIGS. 12-21 are schematic views illustrating another embodiment of a child safety seat assembly 400 that can include a seat shell 41, a base 42 and a retractable anchor structure 500. The seat shell 41 can be removably installed on the base 42. The anchor structure 500 can be assembled with the base 42. The child safety seat assembly 400 can be securely attached with an anchorage fixture provided in a vehicle via the anchor structure 500.

Referring to FIGS. 15-18, the anchor structure 500 can include a support frame, connector arms 52, a transversal bar linkage 53 and a release actuator 54. The support frame can be fixedly secured inside the base 42. Each connector arm 52 can have a hollow structure. The connector arms 52 can be assembled with the support frame, and can be desirably adjusted to extend outward from the base 42 or retract toward an interior of the base 42. The bar linkage 53 can extend transversally, and can be connected with the connector arms 52. The support frame can include a locking structure disposed along an axis of displacement of the connector arms 52, and the bar linkage 53 can include latches 55 operable to engage with the locking structure. The release actuator 54 can be installed with the bar linkage 53, and can be operable to drive the latches 55 to engage or disengage the locking structure of the support frame.

Figure 15:
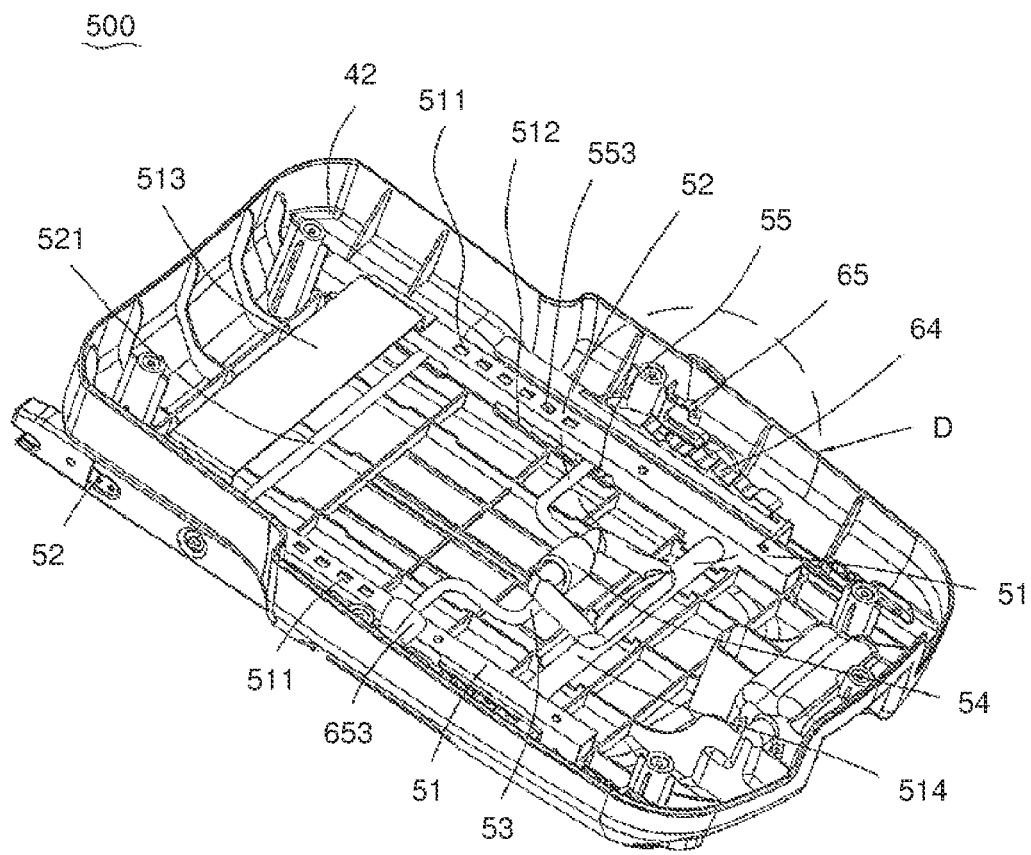
FIG. 15 is a schematic view illustrating a construction of the anchor system provided in the base of FIG. 13.
Figure 16:
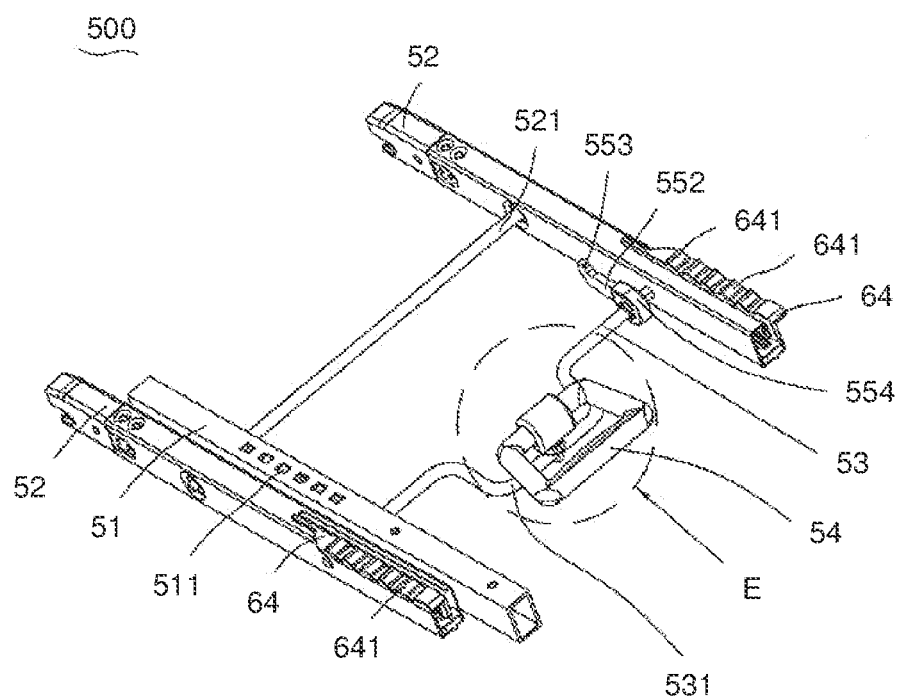
FIG. 16 is a perspective view illustrating the anchor system of FIG. 15 without the base.

Referring to FIGS. 15 and 16, the support frame can include two fixed tube segments 51 that are affixed with the base 42 transversally spaced apart from each other. Reinforcing plates 513 and bars 514 extending transversally may also be affixed with the tube segments 51. Each tube segment 51 can include an inner cavity that extends lengthwise along the tube segment 51. The connector arms 52 can be assembled so as to be movable relative to the tube segments 51. The bar linkage 53 can have two opposite ends respectively assembled through the inner cavity of the tube segments 51 at a perpendicular angle to affix with one associated latch 55. The locking structure of the support frame can be formed as locking openings 511 distributed along an upper surface of each tube segment 51. The locking openings 511 should be at least 3 in number, and include 6 ones as shown in the illustrated embodiment.

Figure 18:
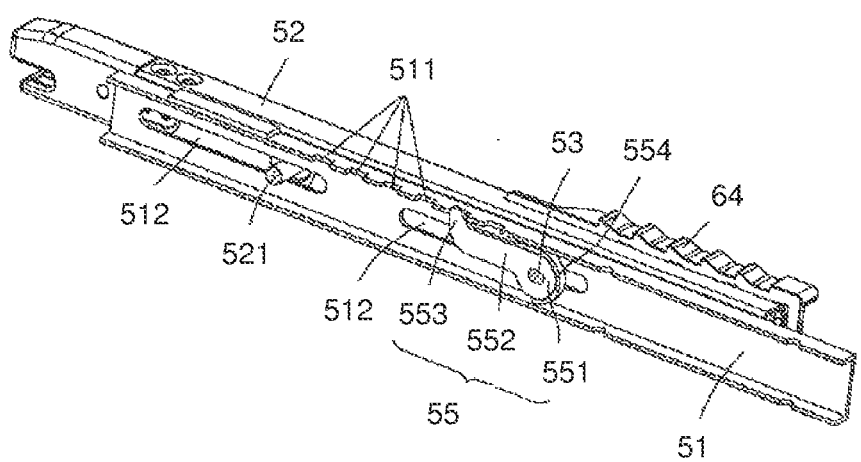
FIG. 18 is a partial cross-sectional view illustrating the assembly of a latch adapted to lock a connector arm of the anchor system in place.
Figure 19:
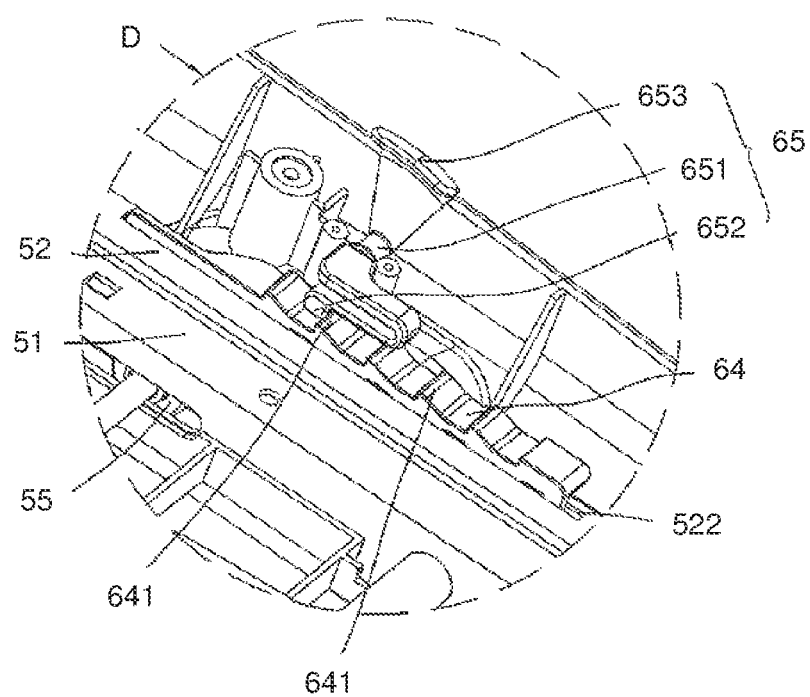
FIG. 19 is an enlarged view of portion D shown in FIG. 15.

Referring to FIGS. 16 and 18, the two latches 55 can be respectively disposed in the tube segments 51. Each latch 55 can be formed in one integral piece including a hub portion 551 affixed with an end of the bar linkage 53, an extension 552 connected with the hub portion 551, and an engaging tip 553 projecting from the extension 552 toward the locking openings 511. The engaging tip 553 can have a protruding shape and size adapted to engage through any of the locking openings 511 to lock the connector arms 52 in position. The hub portion 551 can be disposed in the inner cavity of the tube segment 51, and can have a curved shape that can be wrapped by a protective sleeve 554.

In alternate embodiments, the extension 552 may also be pivotally connected with the hub portion 551, and the release actuator 54 can be directly connected with the extension 552. In this manner, the release actuator 54 can operatively control the rotation of the extension 552 to have the engaging tip 553 engage or disengage any of the locking openings 511.

Figure 17:
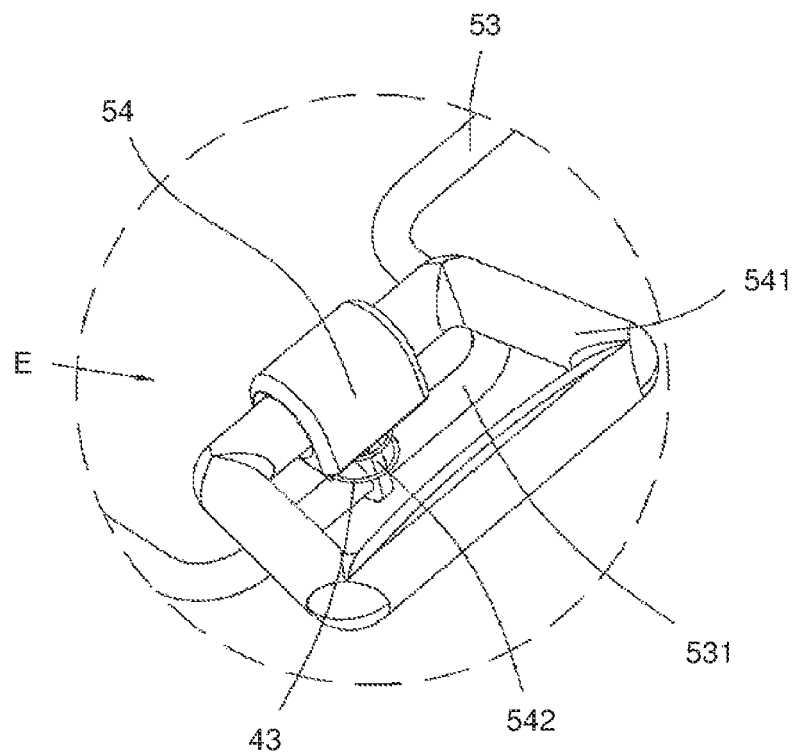
FIG. 17 is an enlarged view of portion E shown in FIG. 16.

Referring to FIGS. 16 and 17, the two connector arms 52 can be respectively assembled with the tube segments 51. A transversal bar 521 can be connected with the two connector arms 52. The release actuator 54 can be placed at a middle region of the base 42 between the two connector arms 52, and can be operable to rotate relative to the connector arms 52 to drive displacement of the latches 55 between a locking state and an unlocking state. More specifically, the bar linkage 53 can have two opposite ends pivotally connected with the two connector arms 52, and a middle bent portion 531 having a U-shape at which the release actuator 54 can be assembled with the bar linkage 53 eccentric from the pivot axis of the bar linkage 53 relative to the connector arms 52. In one embodiment, the release actuator 54 can be formed as a handle to facilitate manual operation.

Referring to FIG. 16, when it is turned upward, the release actuator 54 can drive rotation of the bar linkage 53 (e.g., in an anti-clockwise direction in the figure) relative to the connector arms 52. As a result, the latches 55 can rotate with the bar linkage 53 to cause the engaging tips 553 to disengage from a pair of the locking openings 511, which unlocks the connector arms 52.

Figure 13:
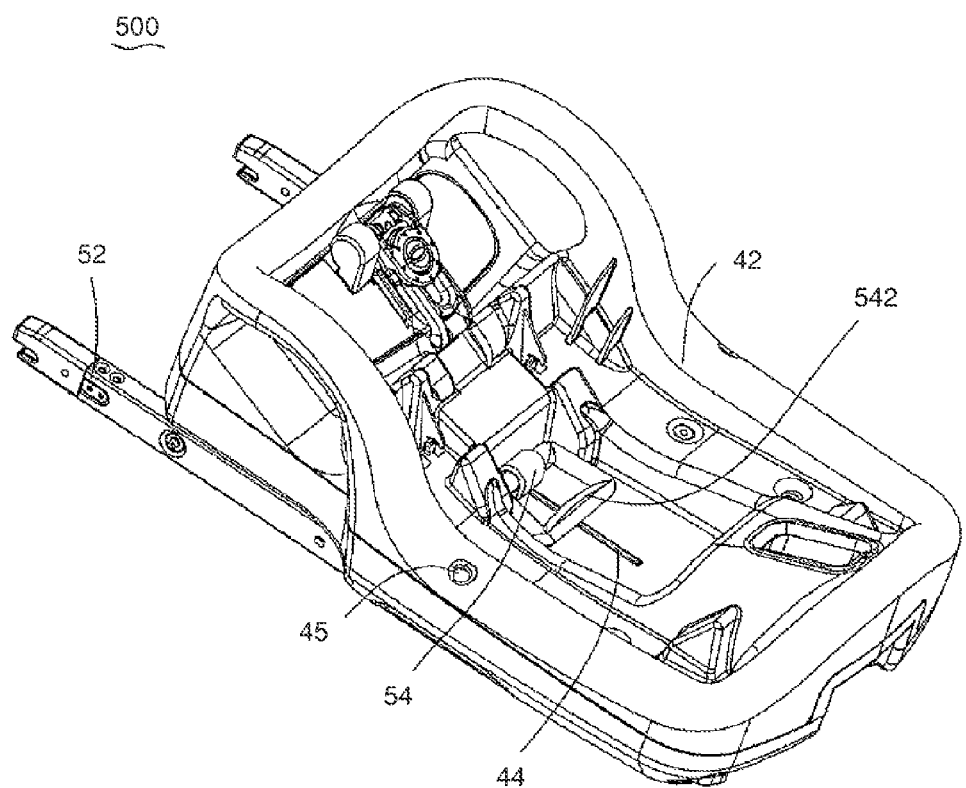
FIG. 13 is a schematic view illustrating the base of the child safety seat assembly shown in FIG. 12 with the connector arms of the anchor system extending outward.
Figure 14:
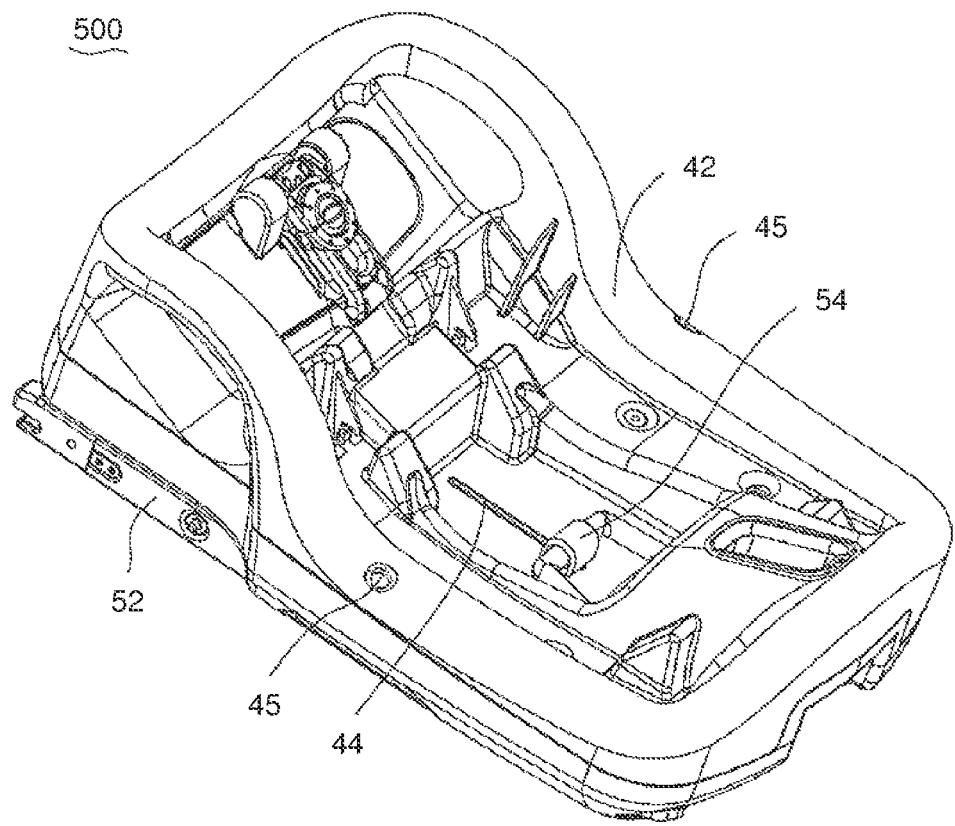
FIG. 14 is a schematic view illustrating the base of the child safety seat assembly shown in FIG. 12 with the connector arms of the anchor system retracted inward.

Referring to FIGS. 13, 14 and 17, the bar linkage 53 can be disposed in the base 42. The base 42 can include an elongated slot 44 that extends lengthwise parallel to the axis of movement of the connector arms 52. The release actuator 54 can include a handle 541 and a stem 542. The stem 542 can be assembled with the bar linkage 53, and pass through the elongated slot 44 to affix with the handle 541 which is exposed and accessible from the outside of the base 42. A spring 43 can be mounted around the stem 542, and have two ends connected with the bar linkage 53 and the base 42. The spring 43 can apply a drawing force that can pull the release actuator 54 downward to a locking state where the connector arms 52 are locked in place with the tube segments 51 via the latches 55.

Referring to FIGS. 12-14 and 19-21, the child safety seat assembly 400 can further include a driving mechanism 60 operable to actuate the locking fasteners 63. Each connector arm 52 can have an end mounted with a locking fastener 63. A construction of the locking fastener 63 may include a latching hook, and an actuating part operable to drive the hook to engage and disengage the anchorage bracket of the vehicle (not shown).

Figure 21:
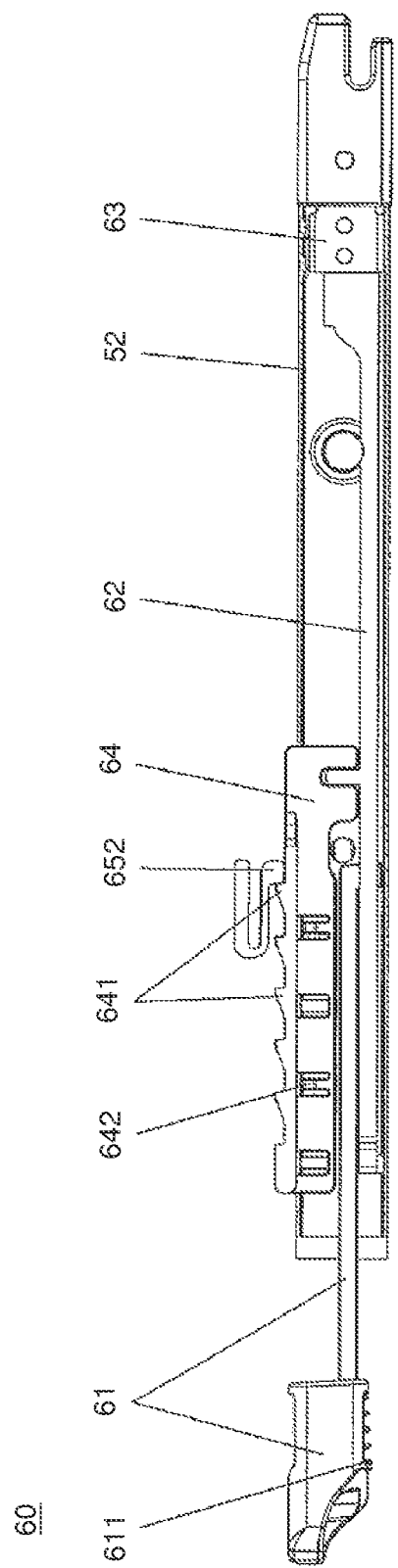
FIG. 21 is a partial cross-sectional view illustrating the driving mechanism shown in FIG. 20.

The driving mechanism 60 can also include linking bars 63, and a fastener release actuator 61 operatively connected with the linking bars 63. Each linking bar 62 can be assembled through the interior of one associated connecting arm 52, and can connect with the latching hook of the fastener 63. The two linking bars 63 may be connected with each other via a transversal link so that the linking bars 63 can be driven in a concurrent manner. The fastener release actuator 61 can be movably assembled in the base 42, and can be accessible from the outside of the base 42. As shown in FIG. 21, a spring 611 can be assembled between the fastener release actuator 61 and the base 42. The spring 611 can apply a biasing force to the fastener release actuator 61 in a direction similar to that of the locking direction. When it is pulled outward, the fastener release actuator 61 can drive the linking bars 62 in movement, which in turn can drive the actuating part of the fasteners 63 to concurrently turn the hooks to the unlocking state.

Referring to FIGS. 12-14 and 19-21, the child safety seat assembly 400 can further include an indicator mechanism adapted to indicate a locking state of the child safety seat assembly 400. The indicator mechanism can include two assemblies of racks 64 and indicator actuating parts 65 respectively associated with the two connector arms 52. The racks 64 can be respectively disposed above the connector arms 52, and can be movable relative to the connector arms 52 within a limited range of displacement. Each connector arm 52 can include a guide slot 522 through which one rack 64 can be movably installed in engagement with the linking bar 62 located in the connector arm 52. An upper surface of the rack 64 can include a plurality of spaced-apart protrusions 641 distributed along the axis of movement of the connector arm 52. In one embodiment, the protrusions 641 can be disposed at intervals mapping with the preset intervals of the locking openings 511.

The indicator actuating part 65 can include a shaft portion 651 pivotally connected with the base 42, a panel 653 fixedly connected with the shaft portion 651 and extending to a viewing window 45 formed through a sidewall of the base 42, and an extension 652 affixed with a side of the shaft portion 651 and lying in contact with the protrusions 641 of one associated rack 64. The panel 653 can have a plurality of indicator marks spaced apart from each other. The indicator marks may include texts, patterns, icons, regions of different colors, or the like. These indicator marks may be printed, painted, drawn, adhered or carved on the panel 653. In one embodiment, the panel 653 may exemplary display two color regions, e.g., red and green regions. A spring (not shown) can be assembled between the indicator actuating part 65 and the base 42 so as to bias the extension 652 in contact against the protrusions 641. A side of the rack 64 can also include a plurality of fingers 642 configured to prevent detachment of the rack 64 from the connector arm 52.

Referring to FIGS. 15 and 16, when the connector arms 52 are to be adjusted, the release actuator 54 can be operated to unlock the connector arms 52. The connector arms 52 then can be driven in movement relative to the base 42, which also drive concurrent displacement of the racks 64. As a result, the protrusions 641 can successively hit the extension 652 so as to cause reciprocated rotational displacement of the panel 653 for indicating a current position of the connector arms 52 with respect to the locking openings 511. For example, the panel 653 may display one color region at the viewing window 45 when the connector arms 52 are correctly aligned with preset locking positions corresponding to a pair of the locking openings 511, and another color region when the connector arms 52 are not aligned with any preset locking positions. In this manner, it can be ensured that the connector arms 52 are stopped at permitted positions where the latches 55 are properly aligned with one pair of corresponding locking openings 511 to effectuate locking.

Figure 20:
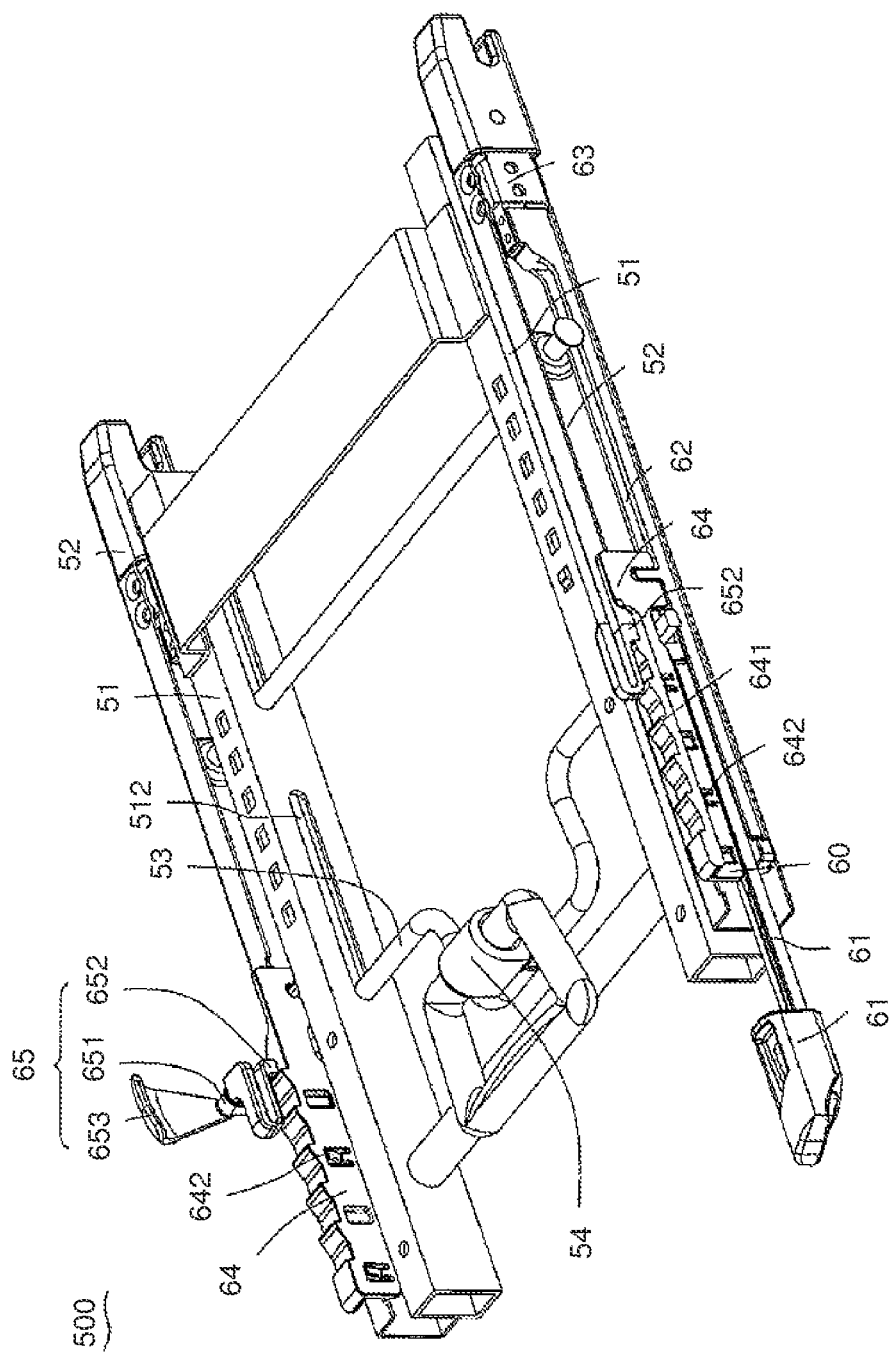
FIG. 20 is a perspective view illustrating the anchor system of FIG. 16 provided with a driving mechanism and indicator mechanism.

Referring to FIG. 20, when the child safety seat assembly 100 is to be installed in a vehicle, the fastener release actuator 61 can be pulled outward (e.g., toward the left side of the figure) to cause displacement of the linking bars 62, which in turn drive the actuating parts of the fasteners 63 to switch the fastener hooks from the locking state to the unlocking state. In the meantime, the movement of each linking bar 62 can also drive displacement of the associated rack 64 in the same direction relative to the connector arm 52, such that one adjacent protrusion 641 of the rack 64 can move away from the extension 652 of the indicator actuating part 65. Biased by a spring action applied on the indicator actuating part 65, the extension 652 and the panel 653 can accordingly rotate about the pivot axis of the shaft portion 651 (e.g., in the clockwise direction in the figure) until the red color region on the panel 653 can display at the viewing window 45 of the base 42 to indicate that the fasteners 63 are in the unlocking state.

Once the fasteners 63 are aligned and engaged with the anchorage bracket of the vehicle, the spring 611 can drive the fastener release actuator 61 and the linking bars 62 to slide in a reverse direction (e.g., toward the right side of the figure), which in turn drive the actuating parts of the fasteners 63 to turn the fastener hooks to the locking state. In the meantime, the sliding movement of each linking bar 62 can also drive displacement of the associated rack 64 in the same direction relative to the connector arm 52. Owing to the displacement of the rack 64, one protrusion 641 can push the extension 652 and the panel 653 to rotate reversely (e.g., in the anti-clockwise direction in the figure) about the pivot axis of the shaft portion 651, until the green color region on the panel 653 displays at the viewing window 45 to indicate that the fasteners 63 are in the locking state.

While the driving mechanism 60 and the indicator mechanism have been described in association with the anchor structure 500, it will be appreciated that this does not limit its scope of application. Similar constructions of the driving mechanism 60 and the indicator mechanism can be implemented in association with any anchor structures, such as the anchor structure 220 described in conjunction with FIGS. 1-11.

Reference is made to FIGS. 13-18 to describe the adjustment of the connector arms 52. The release actuator 54 can be rotated upward, which drives the bar linkage 53 and the latches 55 to rotate in a same direction to disengage the latches 55 from a pair of the locking openings 511. The connector arms 52 can be thereby unlocked for adjustment. The handle 541 then can be grasped and displaced along the elongated slot 44 to move the bar linkage 53 and the connector arms 52 back and forth as desired relative to the fixed tube segments 51 and the base 42. As the connector arms 52 is sliding, the latches 55 also move concurrently along the interior of the fixed tube segments 51. Once the connector arms 52 reach the desired position, the handle 541 can be released. As a result, the spring 43 can urge the release actuator 54 downward to recover an initial position, which drives the bar linkage 53 and the latches 55 to rotate reversely until the latches 55 engage with a pair of corresponding locking openings 511. The connector arms 52 can be thereby locked in position relative to the base 42.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child safety seat assembly comprising:
a base having a left and a right side, a central region located between the left and right side, and a transversal axis extending from the left side through the central region to the right side of the base;
two connector arms respectively assembled with the base at the left and right sides, the connector arms being provided with locking fasteners operable to engage with an anchorage bracket in a vehicle to lock the base in place, wherein the connector arms are movable relative to the base to adjust a length of extension of the connector arms outside the base, and at least one of the connector arms having a plurality of locking openings;
at least one latch assembled with the base and operable to engage through any one of the locking openings to lock the connector arms in position with the base, wherein the at least one latch is slidable along the transversal axis toward and away from the central region of the base, and the connector arms are movable back and forth relative to the base and the at least one latch; and
at least one release actuator disposed in a region of the base between the two connector arms and operatively connected with the at least one latch, wherein the at least one release actuator is operable to drive an unlocking displacement of the at least one latch, the at least one latch and the at least one release actuator being slidable along the transversal axis relative to the base.

2. The child safety seat assembly according to claim 1, wherein the at least one release actuator is connected with a spring operable to bias the at least one release actuator and the at least one latch toward a locking state.

3. The child safety seat assembly according to claim 1, wherein the at least one latch include two latches, each of the two latches being assembled with the base, the two latches being operable to respectively lock the connector arms in position with the base.

4. The child safety seat assembly according to claim 3, wherein the at least one release actuator include two release actuators, the two release actuators being provided in a region between the two connector arms, the two release actuators are respectively connected with the two latches and are slidable along the transversal axis relative to the base to drive displacements of the latches in opposite directions.

5. The child safety seat assembly according to claim 4, wherein a spring is assembled between the two release actuators, the spring being operable to bias the release actuators and the latches in opposite directions toward a locking state.

6. The child safety seat assembly according to claim 4, wherein each of the latches has an elongated shape that extends transversally relative to the base and is assembled through a slot of the associated release actuator.

7. A child safety seat assembly comprising:
a base having a left and a right side, the base being affixed with a locking structure;
two connector arms respectively assembled with the base at the left and right sides, the connector arms being provided with locking fasteners operable to engage with an anchorage bracket in a vehicle to lock the base in place, wherein the connector arms are movable relative to the base and the locking structure to adjust a length of extension of the connector arms outside the base, the two connector arms being respectively connected pivotally with a transversal bar linkage;
at least one latch affixed with the transversal bar linkage and operable to engage with the locking structure to lock the connector arms in position with the base; and
a release actuator disposed in a region of the base between the two connector arms and operatively connected with the latch, wherein the release actuator is operable to drive an unlocking displacement of the latch;
wherein the transversal bar linkage is rotatable relative to the connector arms to drive displacement of the latch between a locking state and an unlocking state.

8. The child safety seat assembly according to claim 7, wherein the locking structure of the base includes a fixed tube segment in which the latch is disposed, the tube segment having a plurality of locking openings through any of which the latch engages to lock the connector arms in position.

9. The child safety seat assembly according to claim 7, wherein the release actuator is assembled with the transversal bar linkage, the release actuator being operable to move with the transversal bar linkage relative to the connector arms, and to drive back and forth displacement of the connector arms relative to the base.

10. The child safety seat assembly according to claim 9, further including a spring operable to bias the transversal bar linkage toward a position corresponding to the locking state.

11. A child safety seat assembly comprising:
a base;
two connector arms assembled with the base, the connector arms being provided with locking fasteners operable to engage with an anchorage bracket in a vehicle to lock the base in place, wherein the connector arms are movable relative to the base to adjust a length of extension of the connector arms outside the base;
at least one latch assembled with the base and operable to lock the connector arms in position with the base;
at least a release actuator disposed in a region of the base between the connector arms and operatively connected with the latch, wherein the release actuator is operable to drive an unlocking displacement of the latch; and
an indicator mechanism adapted to indicate a locking state of the child safety seat assembly, the indicator mechanism comprising:
a rack assembled with one of the two connector arms, the rack having a surface provided with a plurality of protrusions distributed along an axis of movement of the connector arm; and
an indicator actuating part including a shaft portion pivotally connected with the base, a panel fixedly connected with the shaft portion and extending to a viewing window formed through a sidewall of the base, and an extension affixed with the shaft portion and lying in contact with the protrusions of the rack, the panel having indicator marks.

12. The child safety seat assembly according to claim 11, wherein the panel performs reciprocated rotational displacements induced by successive hit of the protrusions against the extension occurring when the connector arms are moving relative to the base.

13. The child safety seat assembly according to claim 12, wherein the protrusions are distributed at intervals mapping with preset locking positions of the connector arms.

14. The child safety seat assembly according to claim 11, further including a driving mechanism operable to actuate the locking fasteners, the driving mechanism comprising:
at least one linking bar assembled in one of the two connector arms and connected with one of the two locking fasteners, the linking bar being engaged with the rack that is movable relative to the connector arm; and a fastener release actuator operatively connected with the linking bar and accessible from the outside of the base, the fastener release actuator being operable to switch the locking fasteners from a locking state to an unlocking state.

15. The child safety seat assembly according to claim 14, wherein the fastener release actuator is operable to switch the locking fasteners from a locking state to an unlocking state and to drive displacement of the rack relative to the connector arms so as to move one protrusion of the rack away from the extension.

16. The child safety seat assembly according to claim 15, wherein the indicator actuating part is driven in movement by a spring force as the rack moves along with the linking bar for switching the locking fasteners from the locking state to the unlocking state.

\* \* \* \* \*